United States Patent [19]

Smith et al.

[11] Patent Number: 4,675,901
[45] Date of Patent: Jun. 23, 1987

[54] AUTOMATIC DISCONNECT DEVICE WITH PROTECTED RINGER

[75] Inventors: Paul S. Smith, Sunnyvale, Calif.; John S. Carothers, Redmond, Wash.

[73] Assignee: Geodynamics Corporation, Santa Barbara, Calif.

[21] Appl. No.: 732,670

[22] Filed: May 10, 1985

[51] Int. Cl.⁴ .............................................. H04M 1/19
[52] U.S. Cl. .................................... 379/387; 379/442
[58] Field of Search ................. 179/81 E, 81 R, 84 T, 179/84 C; 379/387, 442

[56] References Cited

U.S. PATENT DOCUMENTS 3,372,236 3/1968 Schwartz ..................... 379/387 X
3,715,514 2/1973 Bell, Jr. ............................ 379/442
3,997,737 12/1976 Watkins ..................... 179/81 E X

*Primary Examiner*—James L. Dwyer
*Attorney, Agent, or Firm*—Irving Keschner

[57] ABSTRACT

An automatic disconnect device with a protected ringer for providing a secure telephone system, the device being interposed between the telephone company outlet and a modified telephone set. The device generates its own audible tone burst only when a standard ring signal is generated by the telephone company and is designed so that no ambient sound can be transmitted back to the telephone outlet. An on-hook/off-hook detector is incorporated in the device to determine when the handset has been lifted off-hook. If off-hook, the telephone operates normally. In the on-hook status, or position, the telephone is automatically disconnected from the telephone outlet at all times. A visual indication is provided when the telephone is on-hook. The incoming telephone company lines from the outlet are conditioned by filters within the device such that the device is not affected by signals other than normal telephone signals. The conditioning filters also prevent spurious signals picked up by the device or telephone from being passed back to the telephone company lines. In essence, only audio-band signals can pass either way through the device when the telephone set is in the off-hook status, or condition.

6 Claims, 4 Drawing Figures

AUTOMATIC DISCONNECT DEVICE WITH PROTECTED RINGER

BACKGROUND OF THE INVENTION

1. Field of the Invention

The present invention relates to a device interposed between a telephone outlet and a telephone set, the device including a protected ringer whereby ambient sound cannot be transmitted back to the telephone outlet when the telephone set is on-hook.

2. Description of the Prior Art

In the present world of communications vast amounts of information and data is transmitted from one location to another via telephones. Concurrently with the increased use of telephones for information transmission has come the realization that many of the conversations or other sounds occurring in an area in which a standard telephone is located but not in use may be transmitted via the telephone ringer to the telephone company lines and thereafter detected by unauthorized persons having access to the lines. In particular, the small speaker or the electromechanical bell in the telephone used to produce the normal ring sound signals has the capability of being also used as a microphone even with the telephone handset on-hook, the speaker can transmit audible sounds (conversations or otherwise) emanating near the telephone set back out to the telephone lines with the possibility that unauthorized persons can determine the nature of the audible sounds.

The following references relate to systems for limiting access to or otherwise monitoring telephone sets: U.S. Pat. No. 4,393,268 to Miyoshi discloses a telephone security system wherein a unit is interposed between a telephone outlet and a telephone set to answer a call and respond only to the presence of a subsequently dialed-in security code; U.S. Pat. No. 4,392,023 to Sears discloses an off-hook telephone sensing device coupled to the telephone set for detecting the on-hook or off-hook condition of the telephone set the detected condition being utilized to multiplex between voice and data transmission; U.S. Pat. No. 4,396,805 to Wagner discloses a ring detector for a subscriber line interface circuit that includes a two-four wire hybrid circuit having an off-hook detector and a ring generator for producing an AC ring voltage of a given frequency, a circuit breaker being utilized by the telephone company to shut the ring signal off to avoid burn up of equipment in the telephone; U.S. Pat. No. 4,379,953 to Huff discloses a telephone set having a means for depressing a handset switch to prevent the telephone from becoming inoperative if left off the hook for a period of time; U.S. Pat. No. 3,474,196 to Bottos discloses a hand telephone having a switch which, when depressed, inactivates the transmitter portion of the handset; U.S. Pat. No. 4,006,316 to Bolgiano discloses a system for screening out undesired signals from desired signals; U.S. Pat. No. 4,143,250 to Simokat discloses a system for initiating a disconnect by remote signalling from the central office for fault isolation and testing to determine where the fault in the telephone system exists, the telephone company having the burden of initially isolating whether the subscribers equipment is at fault or whether the telephone equipment is at fault; U.S. Pat. No. 4,320,260 to Lechner discloses a circuit arrangement for determining the connection condition of a plurality of subscriber lines in a telecommunication network; U.S. Pat. No. 4,110,569 to Schindler et al discloses a system for determining the on/off-hook status of a telephone set; U.S. Pat. No. 4,152,549 to Ceruti et al discloses an apparatus for suppressing spurious ringing currents which may occur in the subscribers telephone set; and U.S. Pat. No. 4,021,617 to Jones et al discloses a telephone ringer isolator for isolating ringers and extending ringing range on a multiparty telephone line or for range extension only on single party lines.

Although the aforementioned references provide various systems relating to subscribers telephone sets, none of the systems described are directed to the problem of preventing ambient sounds which originate near the telephone set from being transmitted out over the telephone line when the telephone set is on-hook and detected by those not being authorized to have access to such sounds (in this sense, ambient sounds are defined to include, for example conversations and equipment generated noise). Therefore what is desired is to provide a relatively simple and cost effective system which allows a subscribers telephone set to be secured in a manner such that ambient sounds cannot be transmitted out through the telephone lines when the telephone set is in the on-hook status and to limit the transmission between the telephone company lines and the telephone set to audio signals when the telephone set is in the off-hook status.

SUMMARY OF THE PRESENT INVENTION

The present invention provides a device having an isolated telephone ringer and interposed between telephone company lines and the telephone set wherein ambient sounds generated adjacent the telephone set are not transmitted back onto telephone line when the status of the telephone set is determined to be on-hook. In particular, the system in which the present invention is utilized includes (a) a standard telephone set modified by removing the telephone ringer and incorporating a switch in the handset, the switch physically disconnecting the handset receiver and transmitter to prevent ambient sound from being picked up by the handset when the telephone is in use and (b) the present invention which comprises a ringer which rings only in response to the telephone company's standard 20 Hz signal and generates its own tone burst in response thereto, an off-hook detector, the telephone set automatically being disconnected from the telephone lines by a relay when not in use; a visual indicator to indicate when the telephone set is in use; and conditioning circuits that only allow audio signals to pass both ways through the device when the telephone set is in use. The circuitry associated with the ringer speaker and the separation of the relay contacts prevents signals from being transmitted in the reverse direction to the telephone lines when the telephone set is in the on-hook status.

The modified telephone set in which a push-to-talk switch has been implemented is currently available in many telephone distribution centers. The modified telephone set can also be provided with the ringer already removed or a user can subsequently remove the ringer after purchase. In any event the modified telephone set as described is commercially available and relatively inexpensive.

The device of the present invention is relatively inexpensive and non-complex in nature and provides the key feature of preventing ambient sounds from being transmitted from the telephone set to the telephone lines when the telephone set is in the on-hook status providing a secured telephone system for use in installations dealing with material of a classified or otherwise sensitive nature.

BRIEF DESCRIPTION OF THE DRAWING

For a better understanding of the invention as well as further features and objects thereof, reference is made to the following description which is to be read in conjunction with the accompanying drawing wherein.

DETAILED DESCRIPTION OF THE INVENTION

Figure 1:
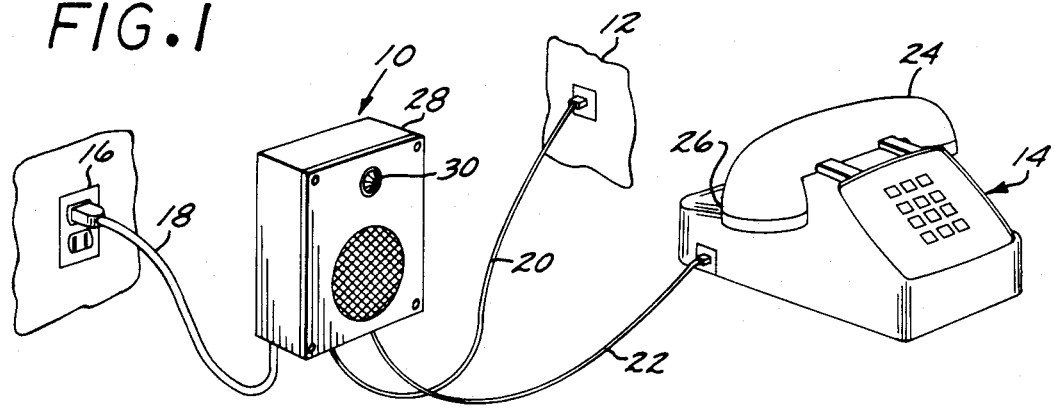
FIG. 1 is a perspective view illustrating a modified telephone set and the device of the present invention.

Referring now to FIG. 1, a perspective view of a system in which the device of the present invention is utilized is illustrated. In particular, the device 10 of the present invention, hereinafter referred to also as a telephone isolator, is interposed between telephone outlet 12 and a modified telephone set 14. The telephone isolator 10 is connected to a standard AC outlet 16 via plug and cord 18. Telephone line 20 couples the telephone outlet 12 to the device 10 and a pair of wires 22 couple the device 10 to the modified telephone set 14 as illustrated. In the preferred embodiment, the telephone set 14 comprises a touch tone type of phone although a rotary type phone may also be utilized. As illustrated, the telephone set 14 comprises a handset 24 which rests on a cradle 26. The telephone handset 24 may be lifted from cradle 26 to change the status of the telephone set 14 from on-hook to off-hook, a common terminology utilized in the telephone art. As will be explained hereinafter with reference to FIGS. 2-4, the impedance of the telephone set 14 changes with the change in status and specifically there is a resistance change when the telephone goes from on-hook to off-hook. This resistance change may be detected by an off-hook sensing device that generates an output signal to a user device, the output signal indicating that the telephone set 14 is now in an off-hook condition and represents a request by the individual using the telephone set 14 for the audio mode of operation. The components of device 10 is enclosed in a sealed container 28, preferably made of sound reflecting materials such as stainless steel, and includes a visual indicator 30 which, as will be set forth hereinafter, indicates that the telephone set 14 is in use. A transducer 32, shown in FIG. 2, is utilized to provide the telephone ringing signal (as will be set forth hereinafter, the ringer normally included in a telephone set has been removed from modified set 14).

Figure 2:
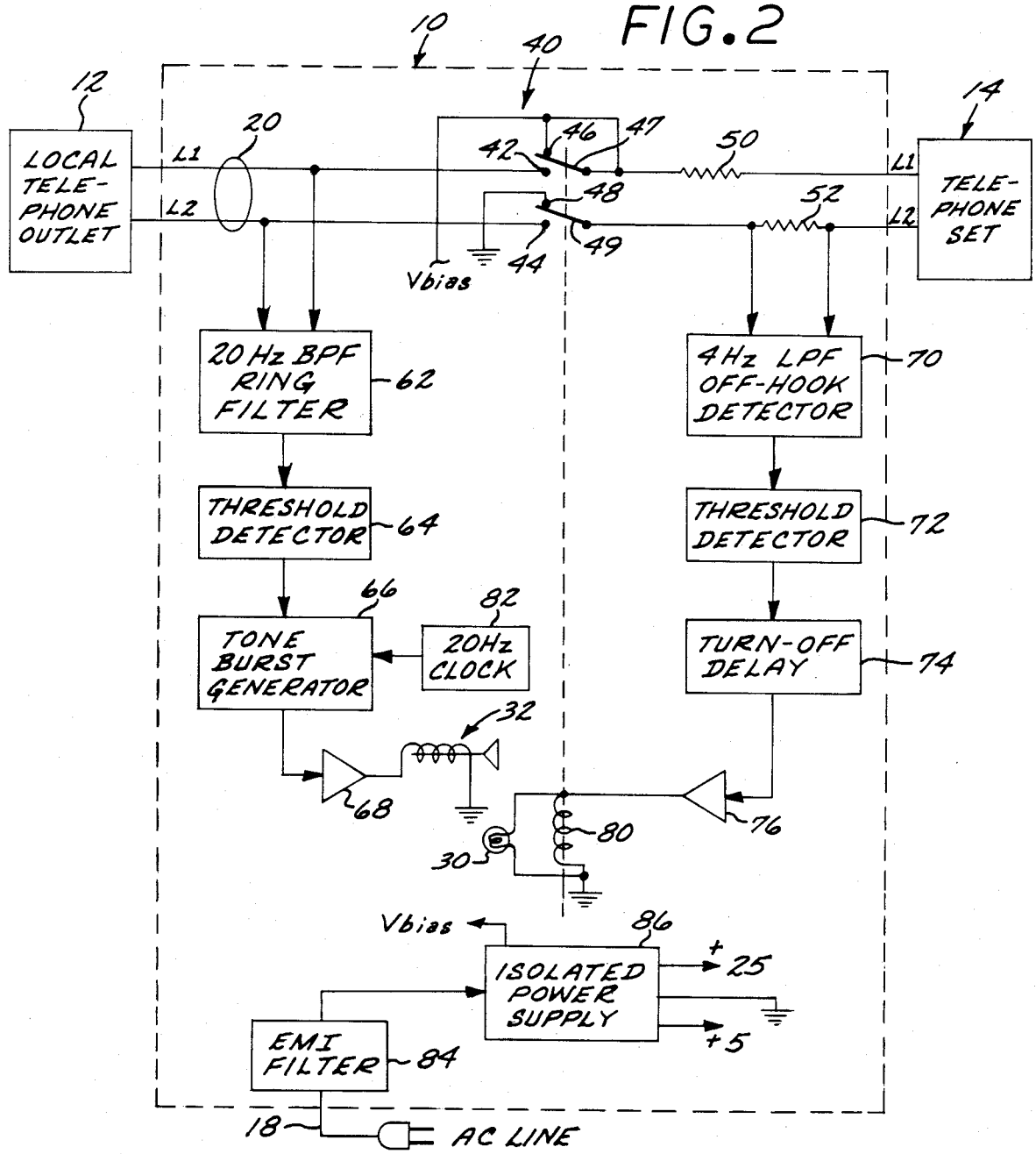
FIG. 2 is a block diagram of the device of the present invention.

Referring now to FIG. 2 a block diagram of the present invention is illustrated. In particular, line 20, comprising lines L1 and L2 are coupled from the telephone outlet 12 to a first set of contacts 42 and 44 of relay 40. A second set of relay contacts 46 and 48 are connected to the telephone set 14 via resistors 50 and 52, respectively, as illustrated. A source of bias voltage V bias is also connected to contact 46 and contact 48 of relay 40 is also connected to ground as illustrated. Relay 40 concludes relay switches 47 and 49 as illustrated. It is to be noted that the position of switches 47 and 49 correspond to the situation when telephone set 14 is in the on-hook status.

Thus, with the telephone handset 24 on cradle 26, a direct connection between the outlet 12 and the telephone set 14 is precluded. Output lines L1 and L2 are connected to a 20 Hz band pass ring filter 62 the output which is coupled to a threshold detector, or limiter integrator, 64 the output of which in turn is connected to a tone burst generator 66. The electrical signal output of the tone burst generator 66 is coupled to an amplifier 68, the output of which is connected to transducer, or speaker, 32 providing an audible ring signal. The output from the telephone lines L1 and L2 on the telephone side of the circuit is coupled to a 4 Hz low pass filter and off-hook detector 70, the output of which is in turn connected to a threshold detector 72. The output of threshold detector 72 is coupled to turn-off delay logic device 74 the output of which is connected to amplifier 76. The output of amplifier 76 is coupled to the energizing, or driver, coil 80 of relay 40 and also to the visual indicating light 30 as illustrated. A 20 Hz clock 82 drives the tone burst generator 66. The input power from the AC power line is applied as illustrated to a electromagnetic interference filter 84 the output of which is coupled to an isolated power supply 86 which provides the voltage bias applied to contact 46 and also supplies the DC voltage levels necessary for operating the various components included in the telephone isolator 10.

In operation, the relay 40 is set as shown to correspond to the situation when the telephone handset 24 is positioned on cradle 26 (on-hook status). In this situation, the telephone lines L1 and L2 are automatically disconnected from the corresponding input ports L1 and L2 on the telephone handset 14. As noted hereinabove, the telephone handset 14 is modified in two ways; a push-to-talk switch (PTS) is added to the standard touch tone telephone and the ringer normally incorporated in the telephone 14 is removed. These modifications to standard telephones can be accomplished in a simple manner and is not considered to be part of the present invention. In order to generate the required ring signal, lines L1 and L2 from the telephone company are instead connected to the ring filter 62. The ring filter 62 determines when the standard ring signal from the telephone company has been generated and generates a signal which is passed on to the threshold detector 64. The threshold detector 64 compares the amplitude of the ring signal passed by the filter to prevent a spurious signal from causing the tone burst generator 66 from being operative. Thus, when the telephone company's standard 20 Hz ring signal is detected, device 10 generates, via tone burst generator 66, an audible tone burst consisting of a 1,000 Hz tone generated by the tone burst generator 66 modulated by the 20 Hz clock 82. The output of the tone burst generator 66 is applied to the transducer or speaker 32, thus producing an audible ring signal. The isolated ringer (in this regard the ringer circuitry can be thought of comprising filter 62, threshold detector 64, tone burst generator 66, amplifier 68 and transducer or speaker 32) is enclosed in a sealed container 28, and is designed to insure that substantially no ambient sound (i.e. talking or other audible signal) produced near where the telephone set 14 is located can be transmitted back on to the telephone line 20. As will be set forth hereinafter in more detail with reference to FIG. 3, the circuitry between line 20 and speaker 32 is designed such that audible signals picked up by speaker 32 is prevented from being passed through to the telephone lines 20 since that circuitry has little or no reverse gain. It should be noted at this point that with regard to the present invention when the ringer is indicated to be isolated, it is in the sense that audible signals in the area wherein the telephone set 14 is located cannot be picked up by the ringer speaker. In the prior art, isolating a telephone ringer means terminating or disconnecting ring signals once the telephone handset is picked up so that components within the telephone are not damaged. Again it is noted that the small ringer speaker can be used as a microphone so that the ring signal speaker is capable as functioning as a microphone, the signal (in the standard prior art system) thus being capable of going back out on the telephone line enabling eavesdropping to occur. As noted hereinabove, the purpose of the present invention is to preclude that possibility.

The relay contact 40 itself also provides further means for isolating telephone set 14 from the telephone lines L1 and L2. In particular, the relay 40 is selected in a manner such that the relay contacts therein are separated further apart than normal. In particular relay 40, is preferably a 1,000 volt relay allowing the contacts therein to be further apart than normal. This makes it more difficult for small, unwanted signals from any source within the isolator 10 or the telephone set 14 to bridge the gap across the contacts and leak out through the telephone lines 20. The 4 Hz low pass filter portion of block 70 is utilized to prevent unwanted static or pickup coming out of the telephone set 14 to inadvertently actuate relay drive 80 and close the relay and put the telephone set 14 directly in contact with the telephone lines L1 and L2. Thus, only the very low frequencies can actuate the off-hook detector portion of block 70. The off-hook detector is a standard device utilized to detect when the telephone handset 24 is on or off the cradle 26. In the case illustrated, if a off-hook status is detected, the off-hook detector generates a signal and applies it to the threshold detector 72. Detector 72 provides a signal large enough to driver 80 via amplifier 76 to position switches 47 and 49 so that relay contacts 42 and 44 connect the telephone set 14 directly to the telephone company's lines L1 and L2. At this point, the telephone company believes that the phone has been picked up and normal operation begins. When the handset 24 is replaced on the cradle 26, a turn-off delay is provided by device 74 to prevent the relay contacts from jittering i.e. jumping back and forth during the short time that the relay contacts are transferring over from the internal source of DC provided by the voltage bias (typically 25 volts) on contact 46 to the phone company line. The bias is applied to the telephone set 14 when the telephone is on-hook, the voltage being provided through relay contact 46, switch 47 and resistor 50. As far as the telephone connection side of L1, L2 is concerned, it appears that a valid DC voltage has been applied thereto as if it is ready to operate. In normal operation, the phone company supplies the DC voltage down the line for the telephone to operate from. When the telephone handset 24 is lifted off the cradle 26, the current flows through the telephone set 14 itself as it starts to operate which in turn tells the phone company that appropriate billing charges can be made. Thus, by having device 10 provide the voltage bias, telephone set 14 is not required to be connected to the telephone line prior to use of the telephone set 14. As noted above, when the off-hook detector 70 indicates that the handset is removed from the cradle, relay driver 80 is energized and switches 47 and 49 are moved to contacts 42 and 44, respectively, thus connecting the telephone outlet 20 directly to the telephone set 14 via resistors 50 and 52 for normal operation. When the off-hook detector subsequently detects a change from the off-hook status to on-hook, the relay switches again so that the contacts/relay switches are in the position illustrated in FIGS. 2 and 3.

Figure 3:
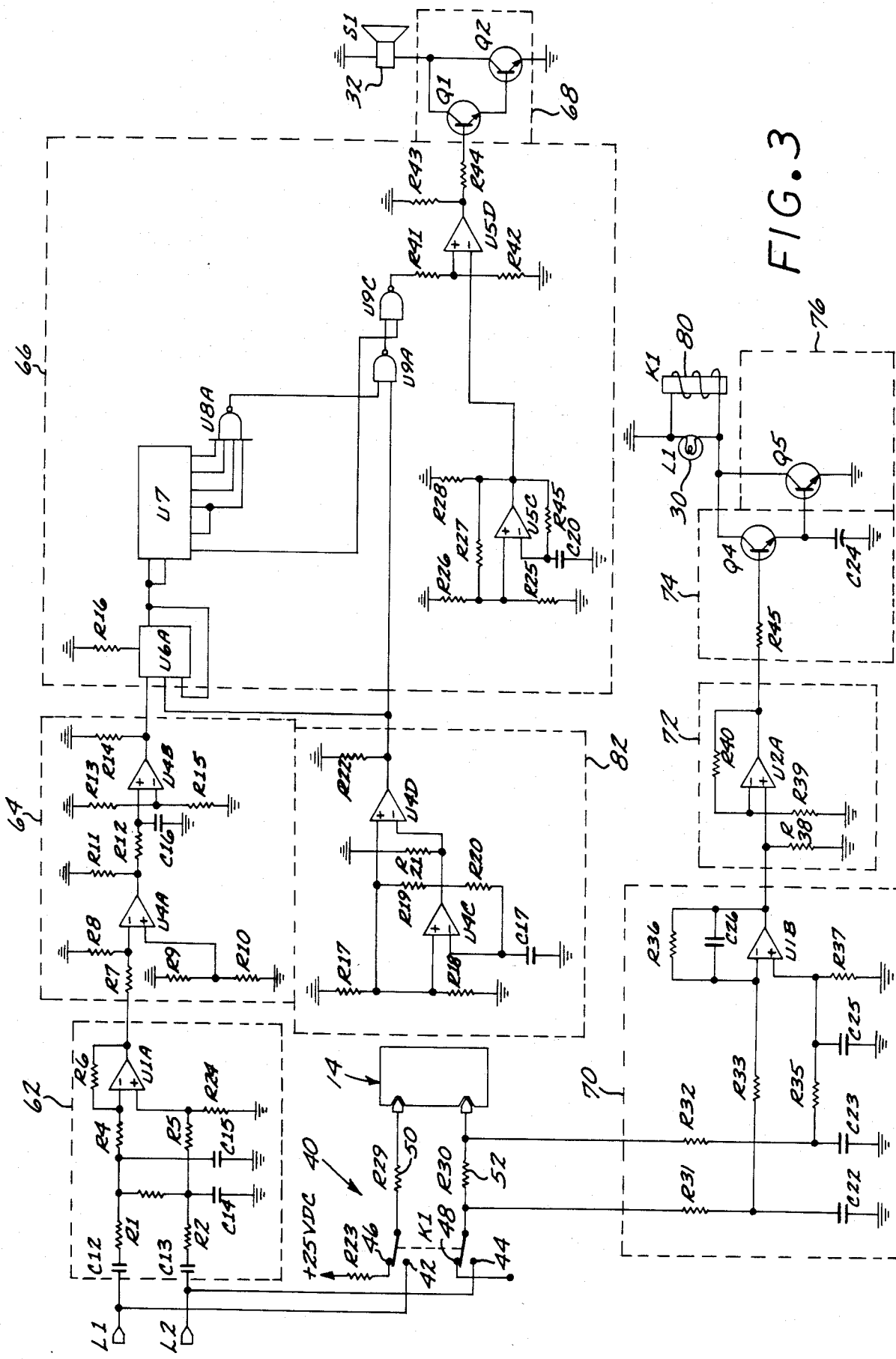
FIGS. 3 and 4 are schematic diagrams of the device of the present invention.
Figure 4:
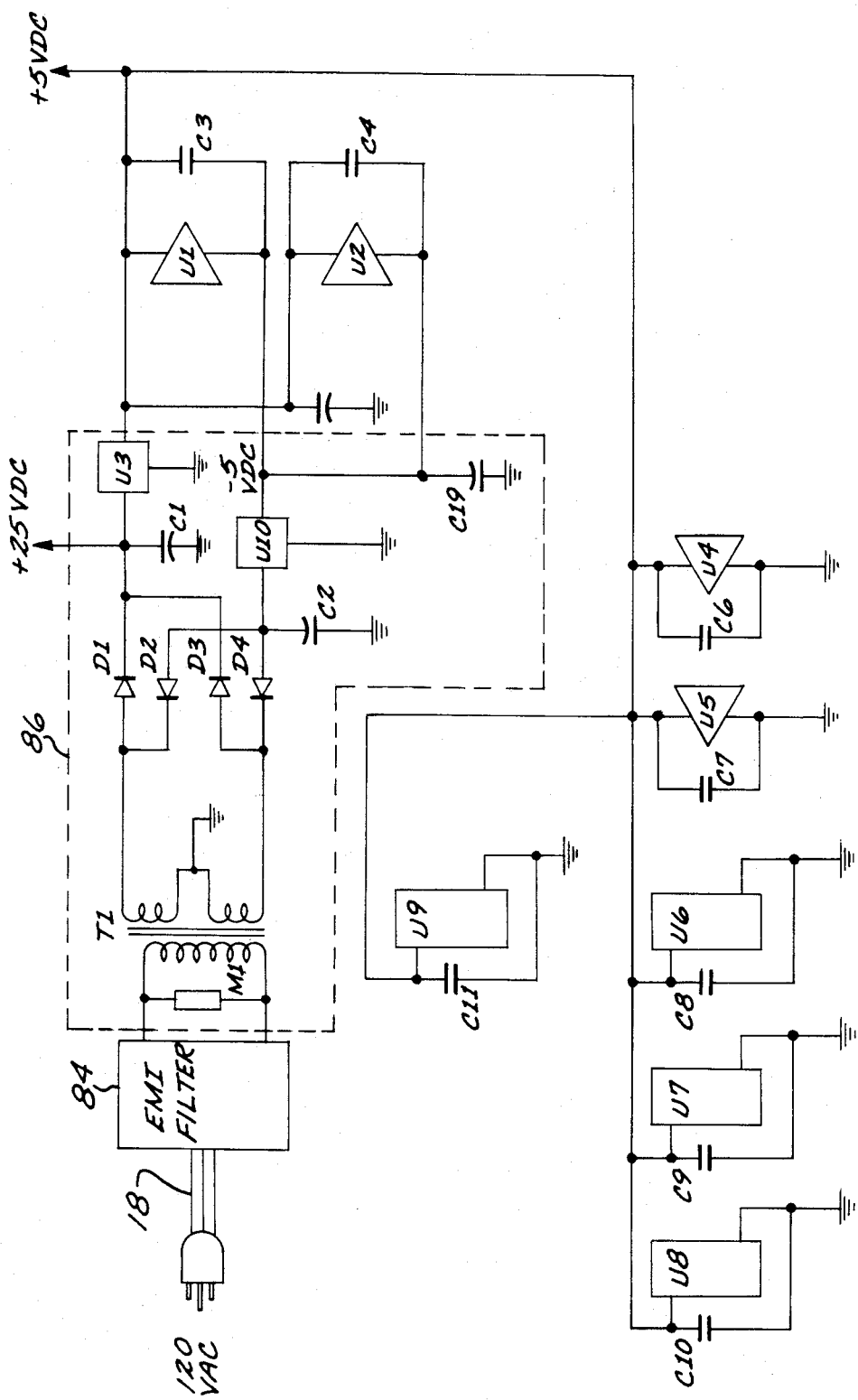

Referring now to FIGS. 3 and 4, a detailed schematic of the block diagram of FIG. 2 is illustrated. The specific details of each element of the schematic diagram will not be set forth in detail because it is believed to be within the skill of one skilled in the art to implement the schematic diagram in accordance with the disclosure that follows. Referring first to FIG. 4 which shows the power distribution among the various integrated circuits (IC's), a source of AC power is applied to EMI filter 84, the output of which is coupled across the input winding of transformer T1. EMI filter 84 blocks the spurious signals picked up on the line from interfering with the operation of device 10. The transformer T1 is standard and the output winding thereof is coupled to a plurality of diodes D1, D2, D3, and D4. U1 and U2 are linear operational amplifiers and are connected from a +25 V bus produced by the diode full-wave bridge (D1, D2, D3 and D4) and the −5 V bus from U10. The remaining IC's (U4, U5, U6, U7, U8 and U9) all operate from the +5 V logic bus produced by U3. This portion of the schematic is drawn separately for purposes of clarity only, and shows the technique of supplying power to the IC's (U4–U9 and U1–U2) to allow them to operate normally. Capacitor C1 is coupled across the output of the diodes, the capacitor output being the DC bias (+25 volt) voltage applied to relay contact 46 as described hereinabove. The circuitry following capacitor C1 i.e. gate U3, amplifier U1, and capacitor C3 provide the +5 volts DC supply necessary for circuit operation. The output from diodes D2 and D4 are coupled across capacitor C2 and the negative 25 volts DC generated thereby is coupled to a voltage regulator U10 which in turn provides a −5 volt DC output also necessary for circuit operations.

Referring now to the two main signal processing branches shown in FIG. 3, the input lines L1 and L2 from the telephone company are applied to capacitors C12 and C13, resistors R1 and R2, capacitors C14 and C15, and resistors R4 and R5. In essence, these elements condition/filter lines L1 and L2 to prevent spurious signals from entering the telephone set 14, and more particularly, acts as a filter to only pass the standard 20 Hz ring signal generated by the telephone company. The signal which is detected and passed is then forwarded to an amplifier U1A which amplifies the signal and applies the amplified output signal to threshold detector 64 comprising resistors R7–R15, amplifier sections U4A and U4B and capacitor C16. In essence, amplifier U4B compares the output signal from band pass filter 62 with a predetermined reference value and generates a signal when the filter output exceeds this value, thus insuring that an output is only generated when the 20 Hz signal is provided by the telephone company. An oscillator circuit 82 comprising resistors R17–R22, operational amplifier U4C, capacitor C17, and amplifier sections U4C and U4D provides a 20 Hz clock signal across resistor R22, the output thereof being applied to flip-flop U6A. The threshold detector, or limiter integrator 64, basically builds up a few cycles of the ring signal, the output from R14 indicating that a ring signal is present. U6A is a flip-flop that converts the analog input signal to a logic signal and provides the logic signal to a counter U7, counter U7 counting off fifteen cycles from the 20 Hz oscillator 82. U6A and U7 are arranged in a manner so that each time a valid ring signal comes down the line, U7 generates fifteen pulses at its output. The counter U7 essentially provides a new signal from the 20 Hz oscillator for each of the fifteen pulses, the newly generated signal not being in the audible hearing range. A 1 Khz tone generator comprising resistors R24–R28, capacitor C20, resistor R45 and differential amplifier U5C is arranged to provide a 1 Khz tone signal which is of sufficient frequency to provide an audible tone. When each of the pulses is generated by counter U7, differential amplifier U5D combines each of the fifteen pulses with the output of the 1 Khz tone generator. The combined signals are coupled via resistor R43 and R44 to amplifier 68 which comprises NPN transistors Q1 and Q2. The output of amplifier 68 is utilized to drive to speaker 32 as illustrated. In essence, a valid ring signal generated by a telephone line is detected and converted into individual ring signal bursts that come down the line, the bursts being detected and utilized to regenerate a new ring signal to notify the telephone user that a valid signal is on line. As set forth hereinabove, the ring detector is isolated in that an audible signal cannot be put into the speaker 32, be converted into an electrical signal and have it remerge on the telephone lines L1 and L2. This is so because the transistor amplifiers are arranged such that even if a signal is generated inadvertently by the speaker 32, the signal cannot pass back through the line by virtue of the current blocking nature of the diodes which comprise transistors Q1 and Q2. Other circuit elements in the path from L1 and L2 to the speaker 32 also do not have a reverse gain and these are not capable of providing an electrical signal in the reverse direction.

The output lines L1 and L2 from the telephone company are also applied to contacts 42 and 44 of relay 40, contact 46 being coupled to the source of 25 volts DC via resistor R23. Contacts 46 and 48 are coupled via resistors 50 and 52 to the telephone set 14. The output across resistor 52 is coupled to the 4 Hz low pass filter/off-hook detector 70 which comprises resistors R31–R37, capacitors C22, C23, C25 and C26 and differential amplifier U1B. As illustrated in the aforementioned U.S. Pat. No. 4,392,023, off-hook detectors detect a resistance change when the telephone goes from an on-hook to a off-hook status. This resistance change is detected by the off-hook sensing resistor 52, device 70 in turn providing a filtered output signal to the threshold detector, or limiting integrator, 72. The output of the threshold detector 72 is coupled to the relay/driver 76 via resistor R45. Relay driver 76 comprises transistor Q5. The output of transistor Q5 is coupled to the drive coil 80 of relay 40 and also to lamp 30. It should be noted that relay 40 provides an additional isolating feature in device 10. The breakdown voltage of the relay is selected to be approximately 1,000 volts, the breakdown voltage determining how far apart the contacts are located. Normal miniature relays are in the range of 200–300 volts so that by using a 1,000 volt relay, the contacts are further apart making it harder for any unwanted signal from telephone set 14 to jump across the contacts and leak out to the telephone lines.

As noted hereinabove, when the telephone set is on-hook there is a separate 25 volt supply DC provided through relay contact 46 to telephone set 14. As far as the telephone connection side of L1, L2 is concerned, a valid DC voltage is applied thereto as if the telephone were ready to operate. In normal operation, the phone company supplies the DC voltage down the line for the phone to operate from. So even if the phone is sitting with the handset 24 on the cradle 26, DC voltage must be applied to it. When the telephone handset is removed from the cradle, the current flow due to the telephone itself as it starts to operate is what tells the telephone company that the phone is picked up. In essence, what device 10 does is to sense that DC current which is provided by the off-hook circuit itself. In particular the DC current is sensed by resistor 52 which is a 10 ohm sensing resistor. The low pass filter portion of the off-hook detector 70 is to prevent anything but a DC signal from coming from the phone and inadvertently actuate the driver circuit that closes the relay 40 and puts it on the line. Thus only very low frequencies i.e. 4 Hz or lower, are enabled to pass through to the threshold detector 72. The turn-off delay 74 is implemented with resistor R45 and capacitor C24 so that when the telephone handset 24 is lifted off the cradle 26, DC current flows through, is sensed and then passes into the threshold detector which provides a large signal to turn Q4 and Q5 on which in turn energizes relay 40 and turns lamp 30 on. Relay 40 is then closed and the telephone is connected to the telephone company line. At this point, the telephone company believes that the phone has been picked up and normal operation begins. When the handset is removed from cradle 26, the turn-off delay prevents the relay contacts from jittering during the short time that the relay contacts are transferring over from the internal source of DC to the phone company line. The off-hook lamp 30 is connected in parallel with the relay coil 80 so that any time the relay is closed the light is on and observers know that the telephone set 14 is connected to the telephone line.

It should be noted that four types of filtering are included in the device of the present invention:

(a) bandpass filtering provided by device component 62 to assure that only legitimate 20 Hz ring signals activate the ring detector circuitry;

(b) low pass filter device portion of component 70 to assure that only DC activation signals from the telephone set activates the off-hook detector;

(c) bandpass filtering provided by resistors 50 and 52 and line capacitance and input capacitance of filters 62 and 70 to assure that only audio band signals are passed between the telephone set 14 and the local line 12; and (d) power line filtering provided by filter 84 to preclude disturbances to normal device operation.

It should be noted that although the device 10 is shown as operating with one telephone, the device can be modified to be operative with more than one telephone set. This situation would require additional output plugs for as many additional phones which would be required to be connected and to have as many off-hook detectors as there are telephones. This could be easily implemented in the isolator as indicated in FIGS. 2-4. It should be also noted that the present invention contemplates being operated from a battery as well as from the AC power source illustrated. Regarding the multi-phone connection, the only decision to be made is which of the multiple phones is off-hook if at all. If it is determined that one or more of the phones are off-hook, relay driver 80 is energized in the manner described previously. It should be noted that although some of the elements are illustrated as discrete components, they are in actuality formed as integrated circuit chips (other than the speaker, lamp, relay filters, and capacitors) and it is contemplated that these elements can be formed on one semiconductor chip.

The present invention thus provides a relatively simple and cost effective technique for securing a telephone set from eavesdropping of third parties. In the on-hook condition the telephone set is automatically disconnected from the telephone line although the telephone company and the telephone user can not ascertain that fact. In this on-hook condition, any audible signals in the area in which the telephone set is located are prevented from going back out through the telephone line. The present invention further includes circuitry that prevents anything but audio signals from passing back to the telephone line even when the telephone set is in use (off-hook status). The present invention thus provides a significant improvement over prior art devices which have attempted to secure the telephone, when not in use, from the eavesdropping activities of third parties.

While the invention has been described with reference to its preferred embodiments, it is understood by those skilled in the art that various changes may be made and equivalents may be substituted for elements thereof without departing from the true spirit and scope of the invention. In addition, many modifications may be made to adapt to a particular situation or material to the teaching of the invention without departing from its essential teachings.

What is claimed is:

1. A device interposed between a telephone outlet, said outlet having at least two lines emanating therefrom, and a telephone set for preventing audible signals from being transmitted back to the outlet when the telephone set is in the on-hook status comprising:

an off-hook detector;

switch means for connecting said outlet lines to said telephone set when said off-hook detector generates a signal indicating that the telephone set had changed from on-hook to an off-hook status, said switch means automatically disconnecting said outlet lines from said telephone set when said off-hook detector generates a signal indicating that the telephone set has changed from off-hook to an on-hook status;

first filter means for generating a first signal only when a valid standard ring signal is detected on said lines when said telephone set is in the on-hook status;

means for detecting said first signal and generating a second signal in response thereto;

means responsive to said second signal and generating an audible ring signal in response thereto, said first filter means, said detecting means and said audible signal generating means inhibiting electrical signals representing audible signals from being transmitted back in the reverse direction to said telephone outlet lines when the telephone set is on-hook, said electrical signals comprising signals within first and second frequency ranges; and second filter means, said first and second filter means allowing audible signals of said first frequency range to pass between the telephone set and outlet via said switch means when the status of the telephone set is off-hook while inhibiting the transmission of signals representing said second frequency range.

2. The device of claim 1 including means for providing a bias voltage to said telephone set when said telephone set status is on-hook to the extent that substantially all the bias voltages normally applied to the telephone set in the off-hook status is also applied during the on-hook status.

3. The device of claim 1 further including delay logic means connected to said off-hook detector to delay reconnection of the telephone set to said outlet lines for a predetermined time period after the change to off-hook status is detected by said off-hook detector.

4. The device of claim 1 further including means for connecting said device to an AC power line and filter means coupled to said connecting means, said filter means preventing spurious signals from being coupled into said device.

5. The device of claim 3 wherein clock means is provided to drive said audible ring signal generating means.

6. The device of claim 1 wherein said switch means comprises a relay having a plurality of contacts, the breakdown voltage of said relay being selected such that the spacing between contacts minimizes signal leakage from the telephone set across the contacts when the status of the telephone set is off-hook.

* * * * *